Patented Jan. 19, 1943

2,308,912

UNITED STATES PATENT OFFICE 2,308,912

METHOD FOR INCORPORATING GUM GUAIAC IN FATS

John L. Doegey, Chicago, Ill., assignor to Industrial Patents Corporation, Chicago, Ill., a corporation of Delaware No Drawing. Application December 6, 1940, Serial No. 368,890

12 Claims. (Cl. 99—163)

This invention relates to the stabilization of oleaginous materials and has to do more particularly with the stabilization of fatty materials, such as fats and fatty oils, by the addition of an antioxidant substance. The invention is concerned specifically with improvements in the stabilization of fats and oils, for example, lard, oleo oil, animal and vegetable fats, by the use of gum guaiac.

An object of the invention is to provide an improved method of incorporating gum guaiac into the material to be stabilized.

Another object of the invention is to incorporate gum guaiac into the material to be stabilized in a more efficient form.

A further object of the invention is to provide a mutual solvent, for introducing gum guaiac into the material to be stabilized, which is volatile and can be separated from the stabilized product thereby leaving the gum guaiac in the stabilized material.

It is well known that gum guaiac is an excellent stabilizer against oxidation for fatty materials, particularly edible fats and oils such as lard. The use of gum guaiac for such purpose is disclosed and claimed broadly in United States Patent No. 1,903,126. The present application is an improvement over the invention of that patent.

In the use of gum guaiac as a stabilizer for fats and oils, considerable difficulty is encountered in securing the necessary dispersion of the gum guaiac therein, since the solubility of the gum guaiac in fat is low. Heretofore, the dispersion has been obtained by agitation of the gum guaiac and fat, but this is a slow and expensive operation, and the desired efficiency of the gum guaiac is not fully realized.

It has been found that gum guaiac may be quickly and efficiently incorporated in fats by the use of a volatile fatty acid. By forming a solution of gum guaiac in a suitable fatty acid and incorporating the solution into the fat the potency of the anti-oxidant ingredients of the reagent are greatly increased. For example, the stabilization of fats and oils against oxidative changes, such as development of rancidity may be unexpectedly prolonged by the use of such solutions.

The solubility of gum guaiac in fatty acids decreases in about direct proportion with the increase in number of carbon atoms in the acid molecule. Solutions of gum guaiac in acetic acid have been prepared containing up to 40 per cent of the gum by weight. Other lower fatty acids, such as propionic, butyric, caproic and caprylic are good solvents. It is desirable to select a fatty acid which has good solvent properties and which may be volatilized by steam at atmospheric or reduced pressures at temperatures below that at which decomposition of the fat occurs. In general, fatty acids containing not in excess of about 10 carbon atoms per molecule may be used. I prefer to used acetic acid.

The concentration of gum guaiac in the solvent may vary within quite wide ranges although I prefer to use fairly concentrated solutions in order to avoid introducing large quantities of solvent into the fat. In practicing the invention I have used solutions containing from 5 per cent to 40 per cent of gum guaiac. Usually, concentrations of 25 per cent to 40 per cent are used when employing acetic acid as the solvent.

In some cases, the gum guaiac may contain foreign bodies which are insoluble in the fatty acid solvent. The dissolving of the gum in the acid may serve as a purification and concentration of the active constituents in the gum. Any undissolved or solid foreign materials remaining suspended in the solution may be removed by filtration.

The solution of gum guaiac is readily incorporated in the material to be stabilized by intimately mixing the solution in the material whereby the guaiac is thoroughly dispersed through the body of the mixture by the mutual solvent action of the fatty acid. Sufficient of the solution is used to add the amount of guaiac necessary to obtain the desired stabilization. Ordinarily about 0.001 per cent to 0.1 per cent and preferably about 0.01 per cent to 0.03 per cent is used, although it is contemplated that still larger amounts may be employed.

The fatty acid solvent need not be retained in the fatty material after the gum guaiac is thoroughly dispersed therein. In fact, it is often preferable to remove the fatty acid, since it may lower the smoke point of the fat, thereby rendering the fat unsatisfactory for deep fat frying.

The fatty acids contemplated for use according to the present invention are readily removed by vaporization. The more volatile acids, such as acetic, may be distilled from the fat at low temperatures even at atmospheric pressures and without a current of steam. Any of the acids containing less than ten carbon atoms in the molecule may be removed by vacuum or steam or both at reasonably low temperatures.

A preferred method of removing the fatty acid solvent is to remove them during the steam deodorization of the fat. It is customary to deodorize the fatty material to remove any undesirable odors in the finished product. The deodorization is carried out by conducting a current of steam through the fat at atmospheric or sub-atmospheric pressures at temperatures of about 100 degrees to 200 degrees C. When the deodorization is conducted on the product after the addition of the gum guaiac solution, the fatty acid is removed in the deodorization step.

If the oil or fat is to be treated otherwise than by deodorization, for example, by caustic refining or hydrogenating, it is desirable to add the gum guaiac after these processes have been completed. In the treatment of vegetable oils, it is often desirable to at least partially harden the oil by hydrogenation prior to the addition of the antioxidant.

For purposes of illustration, examples will now be given of the invention, although it will be understood that the invention is not limited to the specific examples. In all the examples given below, solutions of about 10 per cent gum guaiac in the fatty acids were used.

Example 1

A sample of butter fat showed a stability of eighteen hours by an accelerated stability test. A sample of the same butter fat to which 0.03 per cent of ground gum guaiac added by agitation only tested twenty-two hours. Another sample of the same fat to which 0.03 per cent gum guaiac was incorporated in the form of a solution in acetic acid gave a stability of twenty-five hours.

Example 2

An unstable refined prime steam lard having an accelerated stability test of about five hours was stabilized with 0.10 per cent gum guaiac both with ground gum guaiac and with a solution of guaiac in acetic acid. The sample in which the guaiac was incorporated in ground form showed a stability of thirteen hours. The sample to which the acetic acid solution was added tested twenty-three hours.

Example 3

A sample of refined prime steam lard similar to that of Example 2 was treated with one-tenth per cent solution of gum guaiac in butyric. The accelerated stability test was thirteen hours which was substantially in excess of that of solutions containing gum guaiac by straight mixing.

Example 4

Another sample of refined steam lard was treated with a solution of one-tenth percent gum guaiac in caprylic acid. The accelerated stability test was eighteen hours which is greatly in excess of the stability obtained by ordinary mixing of gum in the lard.

Example 5

A partially hydrogenated cottonseed oil which became rancid in seven days at 70 degrees C. was treated with .002 percent of gum guaiac with and without the use of acetic acid as a solvent. The sample containing the straight gum guaiac turned rancid in nine days at 70 degrees C. The sample treated with a solution of gum guaiac in acetic acid remained eleven days at 70 degrees C. before becoming rancid.

The stabilization test used in the above examples is described in "Oil and Soap," volume 10, pp. 105–109, June, 1933, under the title "An Accelerated Stability Test Using the Peroxide Value as an Index" by A. S. King, H. L. Roschen and W. H. Irwin.

A bland, stable product may be prepared by the present invention. When the solvent is removed, the gum guaiac is substantially the only constituent of the antioxidant remaining in the product. The gum guaiac is present in a more potent form than obtained by methods heretofore.

Obviously many modifications and variations of the invention as hereinbefore set forth may be made without departing from the spirit and scope thereof, and therefore only such limitations should be imposed as are indicated in the appended claims.

I claim:

1. A process for the stabilization of fatty materials against deterioration on standing, which comprises incorporating in the fatty material a solution of gum guaiac in a solvent comprising essentially a volatile fatty acid and then removing said fatty acid thereby leaving in the fats and fatty oils the gum guaiac in sufficient amount to substantially retard said deterioration, and in a highly dispersed and efficient condition.

2. A process according to claim 1 in which the fatty acid is acetic acid.

3. A process according to claim 1 in which the fatty material is an animal fat.

4. A process according to claim 1 in which the fatty material is a hydrogenated vegetable oil.

5. A process for stabilizing lard against deterioration on storage, which comprises forming a solution of gum guaiac in acetice acid, adding said solution to the lard in sufficient amount to substantially retard said deterioration whereby the gum guaiac is present in a highly dispersed and efficient condition and removing by distillation the acetic acid from the treated product.

6. A process according to claim 5 in which the acetic acid is removed during steam deodorization.

7. The method of incorporating gum guaiac into fats and fatty oils to effect stabilization thereof which comprises dissolving the gum guaiac in a volatile fatty acid, adding the resulting solution to the fats and fatty oils and thereafter distilling the fatty acid from the product.

8. The method of incorporating gum guaiac into animal fats to effect stabilization thereof which comprises dissolving the gum guaiac in acetic acid, adding the resulting solution to the fat and thereafter removing the acid by steam deodorization.

9. A process for the stabilization of oleaginous materials normally tending to undergo oxidative changes on standing, which comprises incorporating in the oleaginous material a solution of gum guaiac in a volatile fatty acid in sufficient amount to substantially retard said oxidative changes and then removing said fatty acid whereby the gum guaiac is left in the oleaginous material in a highly dispersed and efficient condition.

10. In the stabilization of fatty materials against deterioration by the use of gum guaiac, the improvement which comprises forming a solution of gum guaiac in a lower fatty acid, incorporating said solution in the fatty material in sufficient amount to substantially retard such deterioration whereby the gum guaiac is present in a highly dispersed and efficient condition and then removing the fatty acid from the mixture of fatty material and gum guaiac.

11. A process for the stabilization of fats and oils against deterioration which comprises dispersing gum guaiac in a fatty acid having not in excess of ten carbon atoms, adding the resulting product to the fats and oils in sufficient amount to substantially retard such deterioration and then removing the fatty acid whereby the gum guaiac remains in the fats and oils in a highly dispersed and efficient condition.

12. A process for the stabilization of fats and fatty oils against deterioration on storage, which comprises treating gum guaiac with a low molecular weight fatty acid to form a solution of the gum guaiac in the fatty acid and to separate any insoluble material, adding said solution to the fats and fatty oils in sufficient amount to substantially retard said deterioration and removing the fatty acid whereby the gum guaiac is present in the fats and fatty oils in a highly dispersed and efficient condition.

JOHN L. DOEGEY.